United States Patent [19]

Roberts

[11] 4,225,848
[45] Sep. 30, 1980

[54] ELECTRIC LIGHTING SYSTEM FOR BICYCLE WHEELS

[76] Inventor: Robert E. Roberts, 2033 N. Sunset Rd., Apache Junction, Ariz. 85220

[21] Appl. No.: 972,675

[22] Filed: Dec. 26, 1978

[51] Int. Cl.² .............................. B62J 3/00; B62J 5/00
[52] U.S. Cl. .................................... 340/134; 340/87; 362/72; 200/61.12
[58] Field of Search .......................... 340/134, 84, 87; 362/72; 200/61.12; 180/82 R; 116/166

[56] References Cited

U.S. PATENT DOCUMENTS

| 2,811,633 | 10/1957 | Bjork | 362/72 |
| 3,987,409 | 10/1976 | Freeman | 340/134 |
| 4,135,229 | 1/1979 | Modurkay | 362/72 |

FOREIGN PATENT DOCUMENTS

| 500337 | 1/1951 | Belgium | 340/134 |
| 978808 | 4/1951 | France | 340/134 |
| 484246 | 9/1953 | Italy | 340/134 |

Primary Examiner—John W. Caldwell, Sr.
Assistant Examiner—Donnie L. Crosland
Attorney, Agent, or Firm—H. Gordon Shields

[57] ABSTRACT

Signal lights secured to front and rear bicycle wheels are connected to the frame of the bicycle for one electrical conductor and to a conductive plate secured to a nonconductive disc which is in turn secured to a wheel. A brush makes electrical contact with the conductive plate, and a conductor extends from the brush to a source of electrical power.

10 Claims, 12 Drawing Figures

ELECTRIC LIGHTING SYSTEM FOR BICYCLE WHEELS

BACKGROUND OF THE INVENTION

1. Field of the Invention

This invention relates to an electrical system for bicycles and, more particularly, to an electrical system including lights secured to the wheels of the bicycle for rotation therewith.

2. Description of the Prior Art

Bicycles are, of course, very well known. Moreover, electrical systems for bicycles are also well known. However, such electrical systems for bicycles are limited primarily to a headlight and a tail light fixed to the frame of the bicycle, and powered by either batteries or a generator. The headlights and tail lights of bicycles are generally not very bright, due to the limited battery-carrying capabilities of the bicycle or due to the small sized generator carried by the bicycle, and accordingly it is difficult for motorists to readily identify bicycles in darkness, and particularly when there is other traffic confusing vehicle drivers with a multitude of lights. An obvious solution to the difficulty of identifying bicyclists in darkness and in other traffic is to attach lights or reflectors to the rotating wheels. A light on a rotating wheel inherently attracts attention, whether the light be a reflection or whether it be from a light source, such as a bulb. However, a problem with a bicycle electrical system secured to wheels is the electrical circuitry required for the rotating wheels. To overcome this problem, several attempts have been made in the prior art to provide electrical systems for wheels.

U.S. Pat. No. 3,987,409 (Freeman) discloses a lighting system for bicycle wheels in which a plurality of lights are attached to the spokes of a bicycle wheel and apertured covers are secured to the bicycle frame. Rotation of the wheels causes the lights or lamps to pass the apertures and to be visible as flashing lights. Each light includes a self-contained battery and accordingly no elaborate electrical circuitry is required.

French Pat. No. 978,808, dated Apr. 18, 1951, also discloses circuitry apparatus for a single light or lamp secured to a wheel axle and rotating with the wheel of a bicycle. A conductive strip is secured to the wheel in the form of a cylinder whose axis is coaxial with the longitudinal axis of the bicycle wheel axle. A conductive brush, secured to the bicycle frame, makes electrical contact with the conductive cylinder. The conductive cylinder, which rotates with the wheel, is connected to the lamp, and the frame of the bicycle is also used as part of the circuitry, and the light is secured to the frame. Thus, the electrical circuit is complete between the frame and the conductive cylinder and brush arrangement for supplying electrical energy to the lamp, which rotates with the wheel.

The inventor of French Pat. No. 978,808 also obtained an earlier Belgian patent, identified as Pat. No. 500,337, and dated Jan. 15, 1951. The Belgian patent discloses an alternate arrangement in which a conductive strip is secured to the spokes of the wheel. The conductive strip accordingly lies in a plane which is somewhat perpendicular to the longitudinal axis of the axle of the wheel. While it is not shown in detail, the conductive strip would, of necessity, be in the form of a truncated cone because the spokes of the wheel are not perpendicular to the axle of the wheel, but rather extend inwardly from the axle or wheel hub, to which they are secured, to the rim of the wheel which is substantially less in width than the length of the wheel hub. In FIG. 3 of the subject patent, the inward slant or slope of the spokes of the wheel is shown, but the conductive strip appears to be planar in configuration, which of course leaves unanswered questions regarding the design and the functioning of the apparatus. A single lamp is secured to the wheel axle.

A third foreign patent, Italian Pat. No. 484,246, dated Sept. 7, 1953, shows apparatus very similar to be Belgian patent, except that the conductive strip does not appear to be secured to the spokes, but rather appears to be independently secured to the bicycle wheel axle. A single lamp is also secured to the wheel axle. Details of the securing of the conductive strip are not apparent.

SUMMARY OF THE INVENTION

The apparatus described and claimed herein comprises an electrical system for bicycles in which a plurality of lamps or lights are secured to the inside periphery of the front and rear wheel rims of a bicycle, with the frame of the bicycle being used for part of the electrical circuit and a separate wire system is used to complete the circuit for each lamp. A conductive disc is secured to and movable with the axle of the wheel and connected to the separate wire system by a brush.

Among the objects of the present invention are the following:

To provide new and useful bicycle lighting apparatus;

To provide new and useful electrical apparatus for bicycle wheels;

To provide new and useful electrical circuitry apparatus for bicycle wheels including using the frame of the bicycle for one conductor of a circuit and using a separate wire for the second conductor of a circuit;

To provide new and useful electrical circuitry apparatus for bicycles including a conductive disc and brush system for connecting the electrical circuitry to lamps secured to a rotating wheel; and To provide new and useful circuitry apparatus for rotating bicycle wheels including a battery, a switch, and a pair of electrical conductors, one of which is a bicycle frame and the other of which is a wire system including a brush and conductive disc arrangement.

DESCRIPTION OF THE PREFERRED EMBODIMENT

Figures 1, 2, 3, 6, 7:
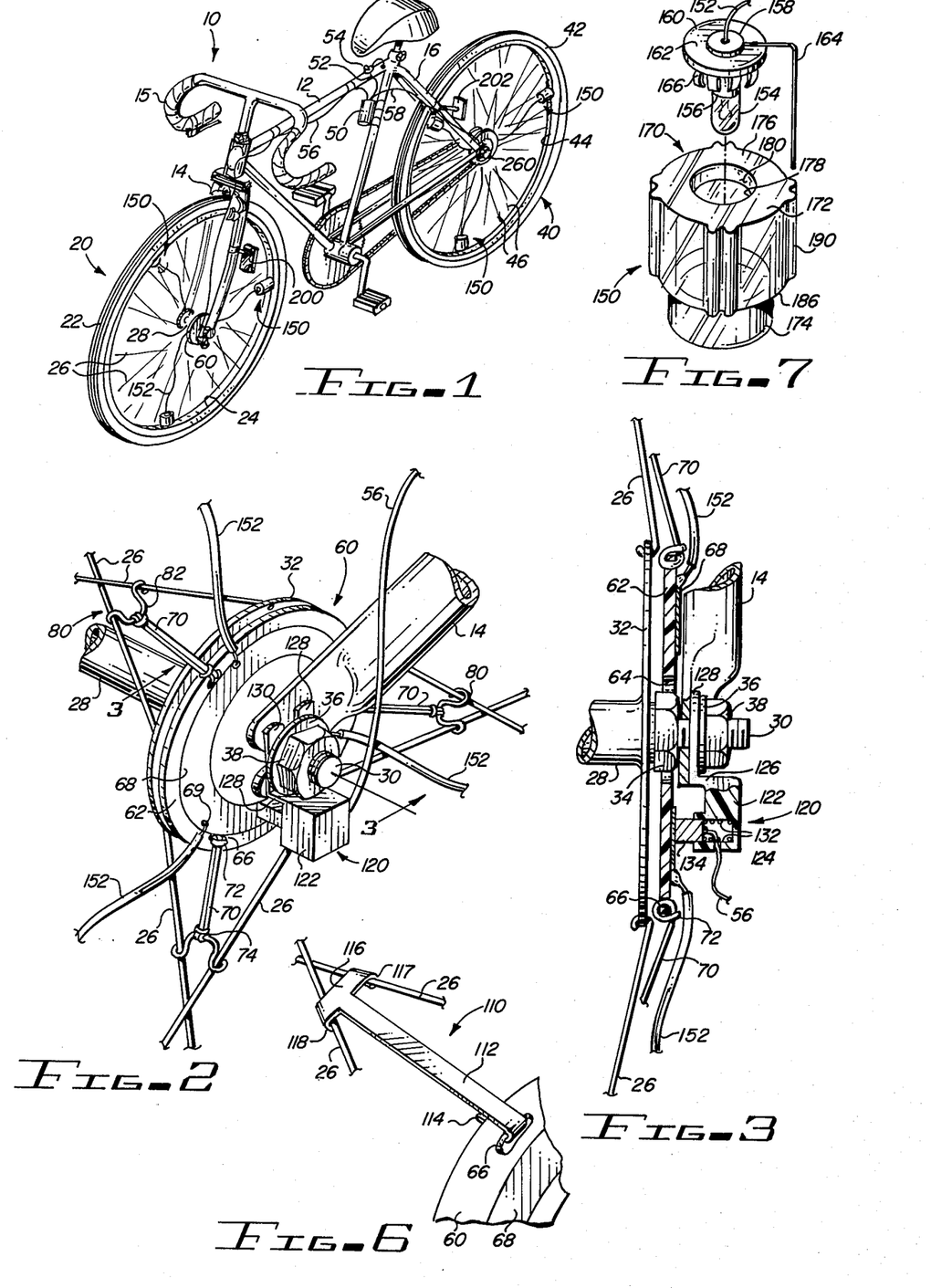
FIG. 1 is a perspective view of a bicycle incorporating the electrical circuitry apparatus of the present invention.
FIG. 2 is an enlarged perspective view of a portion of the apparatus of FIG. 1.
FIG. 3 is a view in partial section of a portion of the apparatus of FIG. 2 taken generally along line 3—3 of FIG. 2.
FIG. 6 is a perspective view illustrating alternate apparatus for securing a conductive disc to wheel spokes.
FIG. 7 is an enlarged perspective view of a lamp and housing utilized in the apparatus of the present invention.

FIG. 1 is a perspective view of bicycle apparatus 10 which includes the apparatus of the present invention. FIG. 2 is an enlarged view of an enlarged portion of the front wheel of the bicycle apparatus 10 of FIG. 1, illustrating a portion of the apparatus of the present invention.

FIG. 3 is a view in partial section of the apparatus of FIG. 2 taken generally along line 3—3 of FIG. 2. It comprises a view in partial section through a portion of the wheel apparatus of FIG. 2, illustrating further a portion of the apparatus of the present invention. For the following discussion concerning the bicycle apparatus 10, and general portions of the apparatus of the present invention, reference will be made to FIGS. 1, 2, and 3.

The bicycle apparatus 10 of FIG. 1 includes, generally, a frame of which only a few portions will be specifically identified, such as a cross bar 12, a front fork 14, and a rear fork 16. While the rear fork is an integral portion of the frame, typically welded together as a structural entity, the front fork 14 is made separately and is connected to the frame for movement relative to the frame by movement of handlebars 15 secured to the front fork 14. The front fork 14 is rotatably journaled to the frame to allow a front wheel 20, which is secured to the front fork, to move for steering purposes. The front wheel 20 includes a tire 22 secured to a rim 24. The rim 24 includes a plurality of spokes 26 secured to it and extending from the rim to a central wheel hub 32 which is in turn secured to an axle housing 28. As best shown in FIGS. 2 and 3, an axle extends through the axle housing 28, and the axle includes a threaded end 30 which is secured to one side of a fork 14 by appropriate fastening means, such as a bolt 38.

Within the axle housing 28, in addition to the axle, are appropriate bearings and cones. The axle and bearing elements are held together by means of threaded members, such as a nut 34. The threaded portion 30 of the axle extends through the axle housing 28, and through the nut 34, and outwardly. One end of one side of the fork 14 is disposed outwardly of the nut 34 and over the threaded end 30 of the axle, and the wheel is secured to the fork with a washer 36 between the nut 38 and the frame member 14. As is well known and understood, the width of the rim 24 of the wheel 20 is less than the width of the axle housing 28. The axle housing 28 includes a pair of hubs which extend upwardly substantially perpendicularly to the longitudinal axis of the axle housing 28 and the spokes are secured to the hubs. Only one hub is illustrated in FIG. 2, but both hubs, as is well understood, receive the plurality of spokes for supporting the rim and the tire.

A rear wheel 40 which in construction is constructed with the same general elements as the front wheel 40, is secured to the rear fork 16. The rear wheel includes a tire 42 secured to a rim 44. The rim 44 is in turn secured to an axle hub by a plurality of spokes 46. The rear wheel of a bicycle also includes one or more sprockets which are used to drive the rear wheel through a chain drive which extends from a front sprocket and a pair of cranks rotatably secured to the frame. Details of bicycle drive systems are well known and understood in the art, and will not be discussed further since they are not involved in the specific elements which comprise the apparatus of the present invention.

A battery 50 is appropriately secured to the bicycle frame. The battery provides the electrical current used to illuminate lamps which are secured to the front and rear wheels 20 and 40, respectively. The battery 50 includes a conductor 52 which is secured to one side of a switch 54. The other side of the switch 54 is appropriately secured or grounded to the frame of the bicycle. The conductor 52 and switch 54 accordingly, with the frame of the bicycle, comprise one leg or portion of an electrical circuit.

The battery 50 also includes a second terminal to which are secured a pair of conductors 56 and 58. The conductor 56 is secured to, but electrically isolated or insulated from, the bicycle frame and it extends generally along one side of the front fork to the axle area of the front wheel, as best shown in FIGS. 2 and 3. The conductor 58 is also secured to, but electrically insulated from, the rear portion of the bicycle frame and it extends to the electrical apparatus secured to the rear wheel 40.

The switch 54 is shown secured to the cross member 12 of the frame of the bicycle 10. The switch 54 is simply a well-known, single pole, single throw switch which opens and closes the electrical circuitry employed as part of the present invention by opening and closing the circuit between the bicycle frame and the conductor 52 which is secured to one terminal of the battery 50.

Since the frame is made of conductive metal tubing welded together, except for the front fork apparatus which is also made of electrically conductive material, but not secured as by welding to the rigid portion of the frame, but rather secured to the frame electrically through various conductive elements, the frame comprises, for electrical purposes, a single conductor for one-half of an electrical circuit. The lights utilized in the apparatus of the present invention include lamps, one side of each of which is electrically connected to the frame and, through the frame, to one side or terminal of the battery 50. The other side of each of the lamps is electrically insulated from the frame side. The electrical circuitry for the other side includes discrete electrical conductors electrically connected to the other side or other terminal of the battery 50 through a pair of discs, including a front disc 60, secured to the front wheel 20, and a rear disc secured to the rear wheel 40.

The front disc 60, best shown in FIGS. 2 and 3, includes a nonconductive substrate 62, which may be made of fiberglass, or the like, impregnated with a polyester resin. Such substrate is electrically nonconductive, generally lightweight, and impervious to water, grease, oil, and the like. Moreover, such substrate is relatively easy and inexpensive to fabricate and is also relatively easily plated with a conductive layer 68, as best shown in FIGS. 2 and 3, and also shown in FIG. 4. The substrate includes a relatively large center aperture 64 which fits over the nut 34 of the front wheel axle assembly. The conductive layer 68 is spaced apart from the outer peripheral rim of the front disc 60 and also from the inner peripheral area about the center aperture 64. The spacing of the conductive layer 68 thus insures that there will be no electrical connection between the conductive layer 68 and any adjacent portions of the bicycle frame or wheel apparatus which would cause a short circuit for the apparatus.

In FIG. 3, the front disc 60 is shown disposed substantially coaxially with respect to the axle housing 28 and the axle 30 of the front wheel 20, but spaced slightly apart from the hub 32. Ths spacing beween the substrate 62 and the hub 32 is for convenience of illustration only, since the substrate 62 will be disposed against the hub 32 due to the manner in which the disc 60 is secured to the wheel 20, as discussed below.

Adjacent the outer periphery of the substrate 62 are a plurality of spaced apart apertures 66 which extend through the substrate. The apertures are spaced apart substantially identical angular distances from each other. Extending through the aperturss 66 are elastic cords or elements which are in turn secured to the spokes 26 by clips 80.

As best shown in FIGS. 2 and 3, elestic cords 70, which are preferably continuous elastic bands, are looped through the apertures 66, and one "end" of the continuous doubled band extends through a loop 72 to secure the elastic band fastener to the disc 60. The other "end" of the doubled elastic band 70 is secured to a clip 80, as shown in FIG. 2, by another loop 74. The loop 74 extends through or around a center portion 82 of the clip. The clip 80 is in turn fastened to a pair of spokes 26 inwardly, or toward the hub 32, from where the spokes 26 intersect. With respect to the hub 32, after the point of intersection, the spokes 26 are diverging from each other as they get closer to the hub.

The clips 80, which are of a fixed size and configuration, is urged toward the hub by the elastic bands which are in an extended tension state between the disc 60 and the hooks 80. With the elastic bands 70 urging the clips 80 toward the disc 60, each clip 80 is securely held to the spokes because it is urged to the location at which it cannot move radially inwardly toward the hub anymore due to the limitation of its size or width with respect to the divergence of the spokes 26 to which it is secured. With three elastic bands secured to the disc 60, as shown in FIGS. 2 and 3, and with each elastic band secured to the disc at a location spaced apart about equally from the adjacent bands, and with each band extending radially outwardly from its securing point on the disc to a clip 80 secured to a pair of spokes 26, the disc 60 is securely held in place on the wheel 20.

Since the elastic bands or cords extend toward the spokes which in turn extend generally inwardly from the hub 32 to the wheel rim 24 (see FIG. 3) the elastic bands, secured to the spokes, accordingly exert a slight inward force on the disc 60 to cause the disc to move and to be held against the hub 32.

With substantially equal tension force being placed on the disc 60 from at least three directions, the disc 60 is held in place generally coaxially with respect to the axle 30 of the bicycle apparatus 10. The disc accordingly rotates with the front wheel 20 from a substantially fixed position with respect to the wheel.

A brush system is used to provide electrical connection between the conductive layer 68 on the substrate 62 of the front disc 60 and the insulated electrical conductor 56. As illustrated in FIGS. 1 and 2, the conductor 56 follows generally along the left side of the front fork 14 to adjacent the axle 30. A brush assembly 120 is secured to the axle 30, and the conductor 56 extends to the brush assembly 120.

As best shown in FIG. 3, but as also shown in FIG. 2, the brush assembly includes a housing 122 with a bore 124 extending into the housing at one end thereof and a flange 126 at the opposite end. The flange 126 extends from the housing 122 generally parallel to the bore 124. Extending substantially perpendicular to the flange 126 is a bifurcated yoke which includes a pair of arms 128 and 130. The arms 128 and 130 are spaced apart a distance which is slightly greater than the diameter of the axle 30. A portion of the axle 30 extends into and is received between the arms 128 and 130 of the brush assembly 120. As best shown in FIG. 3, the yoke of the brush assembly is disposed between the fork 14 and the washer 36 and is held in place by the nut 38.

Within the bore 124 is a conductive compression spring 132. Also disposed in the bore 124, at least partially, is a brush 134. The brush 134 may be made out of appropriate material, such as carbon, which is well known as a brush material. The compression spring 132 extends between one end of the brush 134 and the end of the bore 124 to urge the brush 134 into electrical contact with the conductive layer 68 of the disc 60. The conductor 56 extends into the bore 124 where it is in electrical contact with the brush 134. As is well known in the art, the conductor 56 may be secured to the spring 132 or to a conductive spring cup which receives a portion of the brush 134.

As the front wheel 20 rotates, the disc 60 rotates with the wheel, and electrical contact between the conductive layer 68 on the disc 60 and the brush 134 is maintained by the urging of the spring 132 against the brush 134. In this manner, the electrical circuitry between the conductor 56 and the conductive layer 68 is maintained regardless of the orientation of the bicycle or of the particular rotary or rotational status of the wheel 20. Since the disc 60 is fixed relative to the wheel 20, electrical conductors extend from the conductive layer 68 to discrete lights 150 (see FIG. 1) secured to the spokes of the wheel(s) 20 (and 40, with respect to the rear wheel) adjacent the rim(s) 24 (and 44), as best shown in FIG. 1.

An insulated conductor 152 is electrically connected to the conductive layer 68 of the disc 60, as shown in FIGS. 2 and 3. The conductor 152 in turn extends to a light assembly, such as shown in FIG. 7. The insulated conductor 152 is secured to the disc 60 by extending through an aperture 69 which extends through the conductive layer 68 and also through or into, the substrate 62. Appropriate conductive material, such as solder, secures the conductor 152 to the disc 60 and insures electrical connection between the conductive layer 68 and the conductor 152. As with conductor 56, conductor 152 is appropriately insulated to prevent a short in the electrical system.

A lamp or light assembly 150 is shown in FIG. 7, which comprises a perspective view of the lamp light assembly 150. The light assembly 150 includes a housing 170 which receives a lamp 154, which in turn is secured to a socket 156 and to a lamp holder 160. In FIG. 6, the lamp 154 and its lamp holder 160 is shown spaced apart from the housing 170.

The lamp housing 170 is preferably made of transparent or translucent plastic material. Such housing may most conveniently and inexpensively be blow-molded by contemporary technology. The lamp housing 170 for the front wheel is preferably made of amber material, while the lamp housing for the rear wheel is preferably made of red material, all in keeping with the normal vehicle color codings in current use. Thus, the driver of a vehicle will know the direction a bicycle is traveling by observing the relative locations of the amber and red lights secured to bicycle wheels. If desired, the lamp housing 170 may be slightly wider than the width of a typical bicycle rim or tire to provide illumination from the rear of the bicycle, and from the front of the bicycle, as well as from the side of the bicycle. Maximum visibility is thus provided by the apparatus of the present invention.

The lamp 154, shown in FIG. 7, is appropriately secured to a socket 156. The socket 156 is in turn connected electrically to a pair of conductors, including the conductor 152 which extends from the conductive disc 68, and to a ground conductor 164 which is secured to lamp holder 160 at a boss 158 of the socket 156 which extends upwardly from a planar base 162 of the holder 160. As is typical with lamps, the conductor 152 makes electrical contact with the base of the lamp 154, while the conductor 164 makes electrical connection with the cylindrical side of the socket which in turn contacts the external periphery of the lamp base, all of which is well known and understood. The lamp holder 160 includes the generally flat base 162 adjacent the boss 158. A plurality of spring fingers 166 extend downwardly and outwardly from the planar base 162 of the lamp holder 160. The fingers 166 are inherently self-biased generally outwardly to enable the lamp holder 160 to remain secured to the housing 170. As previously indicated, the lamp holder 160 is made of a conductive material to provide electrical connection with the socket 156. The socket arrangement illustrated herein is well known and understood in the art. If desired, the socket 156 and the lamp holder 160 may be a unitary element, and the socket 156 may either threadedly engage the lamp 154 or may include slots for receiving pins extending outwardly from the sides of the lamp base. The ground conductor 164 is appropriately connected to the lamp holder 160, either by a solder or weld connection or the like. As is obvious, the ground connector or conductor 164 is electrically isolated or insulated from the conductor 152 and the portion of the lamp circuitry directly associated therewith.

The housing 170 will be discussed in detail below, in conjunction with FIGS. 8, 9, and 10.

Figures 4, 5A, 5B, 5C, 8:
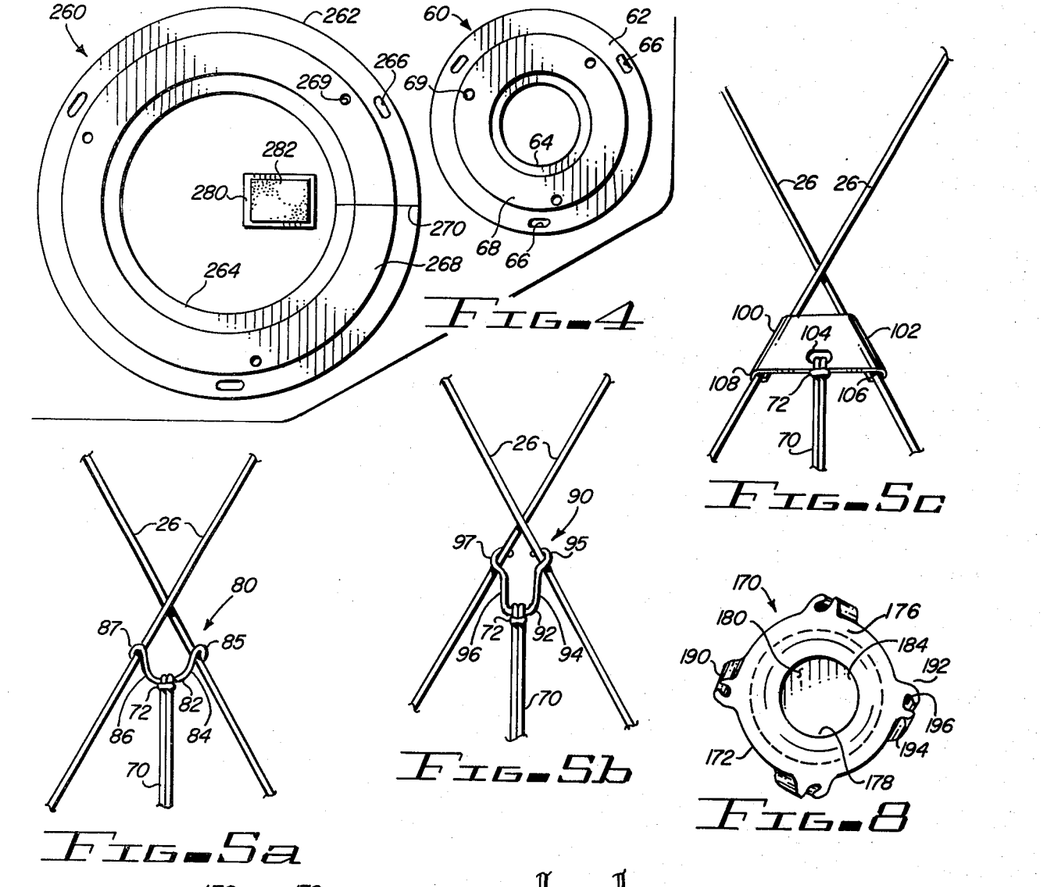
FIG. 4 is an enlarged view of the conductive discs for the rear and front wheels of a bicycle incorporating the apparatus of the present invention.
FIGS. 5a, 5b, and 5c, illustrate three types of fasteners for securing the conductive discs to the wheel spokes, as illustrated in FIGS. 1, 2, and 3.
FIG. 8 is a top view of the lamp housing of FIG. 6.

FIG. 4 comprises a view of a pair of discs, including the disc 60 for the front wheel and a disc 260 for the rear wheel. It will be noted that the diameter of the disc 260 is substantially larger than the diameter of the front wheel disc 60. As a practical matter, the front and rear discs are fabricated from a single blank. The front disc 60, with its substrate 62, central aperture 64, outer apertures 66, and the conductive layer 68, with its apertures 69, has been discussed above in conjunction with FIGS. 1, 2, and 3. It will be seen in FIG. 4 that the conductive layer 68 on the disc 60 is substantially concentric with the central aperture 64, and spaced apart outwardly from the central aperture 64 and also spaced apart inwardly from the outer peripheral portion of the substrate 62.

The rear wheel disc 260 is substantially identical to the small disc 60 in construction, except for size and for a functional radially extending slit 270 used in the assembly of the apparatus. Thus, the disc 260 includes a substrate 262 which is substantially identical to the substrate 62, an interior aperture 264, a conductive layer 268 spaced apart outwardly from the aperture 264 and inwardly from the outer periphery of the disc 260, and a plurality of apertures 266 and 269. The apertures 266 extend through the substrate 262 radially outwardly from the conductive layer 268 and are used to secure the disc 260 in place by elastic bands, such as shown in FIGS. 2 and 3. The apertures 269 extend through the conductive layer 268 and are used to secure discrete conductors to the conductive layer 268. The discrete conductors extend from the apertures 269, and the conductive layer 268 to which the conductors are electrically connected, to individual lamp assemblies 150, such as shown assembled and installed in FIG. 10.

It will be noted that the disc 260 is substantially larger than the disc 60. For convenience of fabrication, the disc 60 is fabricated with the disc 260. The disc 60, after fabrication, is taken from the disc 260 and, when removed from the disc 260, the location of the removal of the disc 60 defines the central aperture 264.

The disc 260 is larger than the disc 60 due to the difference in size between the rear wheel axle assembly and the front wheel axle assembly. Moreover, the disc 60 remains a unitary disc while a disc 260 includes the radially extending slit 270 which allows the disc 260 to be assembled to the rear wheel without removing the rear wheel from the bicycle frame. Since the front wheel axle assembly is much smaller and much simpler than the rear wheel axle assembly, it is not difficult to loosen the nuts which secure the front wheel to the bicycle frame, move the front wheel slightly and insert the disc 60 into its appropriate location, and at the same time secure the brush assembly 120 to the axle, all as best shown in FIGS. 2 and 3. However, with the rear wheel assembly, due to the sprocket and chain apparatus, and most particularly due to the complexity of the multi-speed bicycles with their several sprockets all secured to the rear axle and rear wheel, it would be substantially more time consuming and difficult to assemble a solid disc to the rear wheel. Accordingly, a slit 270 extends radially between the outer periphery of the disc and the inner periphery of the aperture 264. The disc 260 is inherently flexible to a certain extent, and at least to the extent required to separate the ends of the disc at the slit 270 to allow the disc 260 to be inserted in place over or about the rear axle assembly, as shown in FIG. 1.

After the disc 260 is placed on the rear wheel 40, the disc 260 is returned to its original, generally planar, configuration, with the ends of the slit 270 aligned with each other. A backing plate or tab 280 is then placed over the slit and secured to the side of the disc 260 remote from the conductive layer 268. For purposes of securing the plate or tab 280 to the disc, an adhesive layer 282 is disposed on the tab 280. The tab or plate 280 is thus secured to the disc and in turn keeps the disc aligned in its generally planar configuration which prevents distortion of the disc 260 as the disc is secured to the spokes of the wheel by the elastic cords and clips, such as illustrated in FIGS. 2, 3, or 5a, 5b, and 5c and as discussed above. The outward pull of the elastic cords is not sufficient to distort the disc 260 as long as the disc is secured together with the tab or plate 280.

FIGS. 5a, 5b, and 5c comprise three illustrations of clips which may be secured to a pair of spokes 26 for securing a conductive disc to a wheel hub assembly about an axle by means of an elastic member 70, which, as discussed above, preferably comprises a continuous or closed elastic band secured to both the disc and the clip by a pair of loops. FIG. 5a illustrates in more detail the clip 80 shown in FIG. 2, while FIG. 5b illustrates an alternate embodiment comprising a clip 90, and FIG. 5c illustrates a solid clip 100. It will be noted, in general, that the clips 80, 90, and 100 are secured to a pair of adjacent and crossing spokes 26 radially inwardly towards the wheel hub from where the spokes cross. The spokes extend generally radially inwardly from the wheel rim to the wheel hub. While the spokes do not extend in an exact radial fashion, the term "generally radially inwardly" and similar terms are used to indicate the general directions or locations relative to the rim or to the hub of a wheel. As is known and understood, the spokes actually extend at an angle between the hub and the rim as opposed to a direct radial orientation. Moreover, the spokes do not cross in the same plane but are actually spaced apart somewhat. FIGS. 5a, 5b, and 5c are accordingly idealized in their showing. Depending on each particular bicycle make or size, the distance between spokes at the area or location of crossing varies. The clips will accordingly twist with respect to the discs. The twist will have an effect on the orientation of the disc since the elastic bands are inherently flexible.

The clip 80, shown in FIG. 5a, is also shown in some detail in FIG. 2. The clip 80 may be described as a somewhat fancy and wide U-shaped clip with reverse or outwardly extending hooks on the ends of a pair of somewhat diverging arms. The clip includes a center portion 82, to which the loop 72 of the elastic band 70 is secured, and a pair of diverging arms 84 and 86 which terminate in a pair of outwardly curled hooks 85 and 87, respectively. The hooks 85 and 87 are somewhat circular, although not completing a full circle. The purpose of the hooks is to extend around and accordingly hold the diverging spokes 26. As has been explained above, the tension pull of the elastic band 70 tends to draw the clip 80 toward the disc to which the band 70 is secured. In so doing, the clip 80 moves along the pair of spokes until the hooks 85 and 87 can move no more on the spokes. The resultant tension of the band 70 against its disc is then used to maintain the disc in a particular orientation. With at least three, or possibly four, sets of bands 70, each secured to a different clip and each extending in a different direction, spaced apart from adjacent bands substantially equally, the disc remains oriented, as desired, over its axle.

The spacing of the arms 84 and 86, with their respective hooks, determines the ultimate position that the clip will maintain with respect to a pair of spokes. It will be noted, as discussed above, that the clips are preferably placed on the diverging portion of the crossing pair of spokes, as opposed to the converging portion, or on the portion of the spokes below where they cross with respect to the disc. That is, the clips are between the disc and the point or area where the spokes cross. With the wheels substantially symmetrical with respect to the spokes, the clips, if they are substantially alike in dimensions, will be located at about the same radial distance away from their disc. This insures that the clips will remain in place with a constant tension placed on the disc and the clips by the elastic bands extending between the disc and each clip.

A slightly different type of clip is illustrated in FIG. 5b. A clip 90 is shown secured to a diverging portion of a pair of crossing spokes 26. The clip 90 is also secured to an elastic band 70 by a loop 72 at the center portion 92 of the clip 90. The clip 90 includes a pair of generally upwardly extending, and generally parallel, arms 94 and 96. The arms 94 and 96 terminate in a pair of hooks 95 and 97 which extend outwardly from their respective arms and then curve inwardly. This results in a less distance between the two hooks or curves of the arms 94 and 96. The net result, with respect to securing a disc to a pair of spokes, is that the clip 90 will generally be disposed closer to the crossing point of the spokes than, for example, the clip 80 of FIGS. 2 and 5a.

A solid clip 100 is shown in FIG. 5c secured to a pair of crossing spokes 26 between the converging area and their widest divergency area at the hub. The clip 100 includes a generally flat, fan shaped portion 102 which includes an aperture 104 to which the loop 72 of the elastic band 70 extends for securing the elastic band 70 to the clip 100. The generally flat, fan shaped portion 102 includes a pair of curved slots or recesses 106 and 108 which each receive a spoke 26. As with the previous embodiments, the configuration of the clip, and its particular dimensions, define the minimum distance that the clip will maintain relative to a disc under a tension pull of an elastic band or element. The tension of the elastic band accordingly holds the clip in place and, with other geometrically spaced clips and elastic bands, holds the disc in place relative to the axle of a wheel. The preferred orientation of a disc is substantially coaxial to the longitudinal axis of the axle.

Each of the clips 80, 90, and 100 may be easily removed from the spokes by simply moving the clip outwardly with respect to the disc to which they are secured, which is toward the point or area at which the spokes cross, and away from the disc. The actual distance between the spokes decreases as the crossing point or area is reached. The hooks or recesses of the respective clips are then easily removable from the spokes.

FIG. 6 is a perspective view of a disc 60 secured to a pair of intersecting spokes 26 by a solid clip 110. In the embodiment of FIG. 10, no elastic band is required because a plurality of solid clips 110 are used to secure the disc to the spokes of the wheel. The solid clip 110 is secured to a pair of adjacent and crossing spokes 26 between the point of crossing of the spokes and the disc 60, as is typical with the clip apparatus shown in FIG. 5.

The clip 116 includes a center portion 112 which is generally elongated and serves as the primary connector between the two ends. One end of the connector 110 comprises a hook 114, which is secured to one end of the elongated center portion 112. The hook 114 extends through the aperture 66 in the outer peripheral portion of the disc 60 and spaced apart from the conductive layer 68. The end of the clip 110 remote from the hook 114 comprises a transverse arm 116 which extends substantially perpendicular to the center portion 112. The transverse arm 116 includes a pair of hooks 117 and 118 which secure to the spoke 26. The hooks 117 and 118 are disposed at the outer ends of the arm 116. In practice, the hooks 117 and 116 are simply bent around the spokes 26 to hold the clip 110 in place, and accordingly to hold the disc 60 in place. The length of the arm 116 is sufficient to allow the clip 110 to be used with bicycle wheels of various sizes, whose spokes vary in length and in angular orientation with respect to the crossing of adjacent spokes.

To compensate for the spacing between the adjacent and crossing spokes to which the clip is secured, the central portion 112 may be twisted about its longitudinal axis to most conveniently fasten to the spokes. Also, the transverse arm portion 116 may also be bent or twisted as required to fit the spokes.

The hook 114 is also bendable from the center portion 112, if desired, rather than being fixed in place. That is, the hook 114 simply may comprise an end portion of the center 112 which is bent to form the hook which extends through the aperture 66 in the disc 60.

It will be noted that the profile of the particular clip or hook means used to secure a disc to spokes is relatively flat. This is so with the clips of the embodiment of FIGS. 5a, 5b, or 5c, and the clip 110 of the embodiment of FIG. 10. The clips do not project outwardly of the wheel-spoke area so as to cause any problems with respect to the frame of the bicycle, the fenders, or the like. Obviously, the tension apparatus of FIGS. 5a, 5b, and 5c are substantially self-adjusting with respect to the disc and the area of the spokes to which they are secured. For optimum securing of a disc, the clips used with any particular disc should be the same, and the same size tension means, such as an elastic band, spring, or the like, should be used so as to provide relatively uniform tension to the disc. With the solid clip 110 of FIG. 10, a disc will remain in place regardless of the particular length of the clip and accordingly uniformity of length is relatively unimportant.

Turning again to FIG. 7, it will be recalled that the details of the lamp 154, with its socket, and the like, have been discussed in some detail above. However, the housing 170 has not been discussed. In the following discussion of FIG. 7, reference will also be made to FIGS. 8 and 9. FIG. 8 is a top view of the housing 170, while FIG. 9 is a perspective view of the housing 170, showing the housing divided into two halves, spaced apart, to illustrate details of the construction of the housing.

The housing 170 is preferably a one-piece housing fabricated of colored plastic as by a blow-molding process. The housing comprises a pair of coaxial cylinders, including an upper cylinder 172 and a lower cylinder 174. The upper cylinder 172 is substantially larger in diameter than the lower cylinder 174, and the upper cylinder 172 is also longer in overall height than is the lower cylinder 174. The two cylinders are, of course, unitary.

The housing 170 includes a top wall 176 which includes an aperture 178 extending through the top wall 176. The aperture 178 is substantially coaxial with both the upper cylinder 172 and the lower cylinder 174. The thickness of the top wall 176 is sufficient only for purposes of fabrication and strength and is relatively immaterial otherwise.

Within the housing 170 is an inner cavity 180, which includes a portion of the upper cylinder 172 and also a portion of the lower cylinder 174. An interior shoulder 182, as best seen in FIG. 9, divides the upper portion of the inner cavity 180 from the lower portion of the inner cavity within the respective upper and lower cylindrical portions 172 and 174 of the housing 170. As illustrated in FIG. 8, the thickness of the walls of the housing 170 is generally uniform, including the thickness of the upper or top wall 176 and also the thickness of a lower end wall 184 which comprises the bottom of the lower cylinder 174, and which also comprises, obviously, the lower end wall for the entire housing 170. An exterior shoulder 186 is defined on the exterior of the housing 170 between the upper cylinder 172 and the lower cylinder 174. The purpose of the shoulder 186, and the differences in the diameter and length of the upper and lower cylindrical portions of the housing 170 are discussed below, in conjunction with FIG. 10.

On the exterior of the upper cylinder 172, and extending generally along or in the direction of the longitudinal axis, or generally aligned with the longitudinal axis of the housing 170, are four pairs of ribs 190. The pair of ribs comprises a pair of adjacent spoke holders which are molded as integral parts of the upper cylindrical portion 172 of the housing 170. Each pair of ribs 190 includes a pair of spoke holders 192 and 194 having an inner recess 196 disposed between them. The pairs of ribs are disposed in diametrical relationship, with one rib of each pair slanted slightly in the opposite direction for securing to adjacent spokes, which are typically extending in opposite directions. One spoke of each pair of adjacent spokes will be received into a recess 196 to secure the lamp housing 170 in place.

Figures 9, 10:
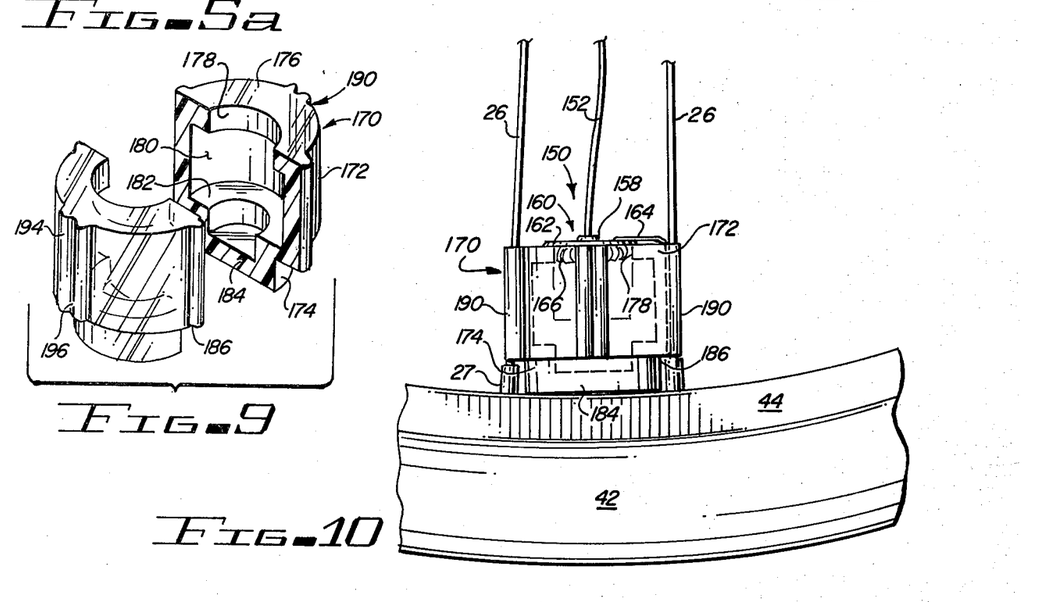
FIG. 9 is a perspective view showing the lamp housing of FIGS. 7 and 8 taken apart.
FIG. 10 is an enlarged view illustrating the securing of the lamp and housing to the inner periphery and spokes of a bicycle wheel rim.

FIG. 10 comprises an enlarged view illustrating the securing of a light 150 and its housing 170 to a pair of spokes 26 adjacent a rim 24 of a bicycle wheel. The tire 42 is also shown in FIG. 10 as secured to the rim 44. It will be noted that the housing 170 is disposed between the spokes, with the spokes received in the recesses 196 between an adjacent pair of ribs 190 (see also FIGS. 8 and 9).

The purpose of the shoulder 186 between the upper cylindrical portion 172 and the lower cylindrical portion 174 of the housing 170 is illustrated in FIG. 10. The spokes 26 are received in a spoke holder 27, a portion of which extends through the rim 44 to secure the spokes in place. As is understood, the spokes 26 threadedly engage into the spoke holders 27. The spoke holders 27 are, of necessity, somewhat larger in diameter than the diameter of the spokes 26. Since the upper cylinder 172 is dimensioned to fit between the spokes 26, the lower portion of the housing 170 must be dimensioned slightly less so as to accommodate the spoke holders 27. The difference in the dimension between the lower cylinder 174 and the upper cylinder 172 is accordingly to accommodate the spoke holders 27. The height of the lower cylinder 174, or the distance between the bottom wall 184 and the shoulder 186 is of an appropriate length to accommodate spoke holders 27 of various lengths.

The conductor 152, which is insulated, extends to the lamp holder 160, where it connects with a lamp disposed in or secured to the lamp holder 160. The ground conductor 164 extends from the planar top 162 of the lamp holder 160 into a recess 196 (see FIG. 7) where it makes electrical contact with one of the spokes 26 which is also disposed in or received in the recess 196. The conductor 164 is disposed in the recess 196 between the outer portion of the housing 170 and the spoke 26, so as to make electrical contact with the spoke over a substantial portion of the length of the conductor to insure an electrical connection. There is sufficient force exerted by the ribs 190 to hold the spoke 26 tightly against the conductor 164 to complete the electrical circuit for the lights 150. With the housing 170 made of nonconductive material, the electrical circuitry is kept separate so as not to cause a short circuit and yet the frame of the bicycle is used as a ground return for the electrical circuitry, as discussed above.

The above descriptive material has pertained to the electrical circuitry involved in the lighting apparatus of the present invention. However, there are two additional elements which comprise part of the overall system but which are not directly related to the electrical circuitry. The two elements include a pair of mirrors 200 and 202. Referring again to FIG. 1, the mirrors 200 and 202 are shown secured to the frame of the bicycle 10. The mirror 200 is shown secured to one portion of the front fork 14, while the mirror 202 is shown secured to a portion of the rear fork 16. The mirror 200 and the mirror 202 are both disposed outwardly from the frame so as to be held in a position to the outside of the respective front and rear wheels so as to maximize their function and efficiency in reflecting forwardly and rearwardly, respectively, the illumination from the lights secured to the respective front and rear wheels as the wheels rotate and come into focus with respect to the mirrors.

The mirror 200 is secured to one side of the front frame 14 and is disposed outwardly of the frame, beyond the rim 24 of the front wheel 20. It is adjusted so that it reflects forwardly the lights of the front wheel as they are momentarily brought into focus in the mirror 200. The mirror 200 is preferably adjusted so that its reflections are generally parallel to the surface over which the bicycle 10 is disposed. This effectively maximizes the employment of the mirror in advising motorists or other bicyclists or pedestrians in front of and facing the bicycle that the bicycle is moving toward them.

If the front lights 150 include an amber housing 170, then the amber lights will be reflected forwardly as each light passes a particular focal point of the mirror as the front wheel 20 rotates.

The mirror 202 is secured to the rear frame 16 and is disposed outwardly with respect to the rim 44 and tire 42 of the rear wheel 40. The mirror 202 is adjusted so that it reflects rearwardly in substantially the same manner that the front mirror 200 reflects forwardly. The mirror 202 is preferably adjusted so that its reflections extend rearwardly substantially parallel to the surface over which the bicycle 10 is operating.

If the housing 170 for the lights 150 secured to the rear wheel 40 are red, then the mirror 202 will reflect rearwardly the red lights as the lights rotate with the rear wheel 40. This will alert motorists to the rear of the bicycle of the bicycle's presence.

The mirrors 200 and 202 will, of course, reflect forwardly and backwardly (or rearwardly) the lights from the respective lights on the front and rear wheels as the lights pass a particular location, which location comprises a particular point of focus of the respective mirrors. Thus, the light reflected forwardly and rearwardly or backwardly will, to viewers in the front and at the rear of the bicycle 10, appear to be a series of flashing lights, which flashing is occasioned or caused by the rotation of the wheels.

The combination of the lights themselves, as they rotate with the wheels, and the reflections from the mirrors, serve a primary purpose of alerting others to the presence of the bicycle. As illustrated, there are three lights secured to the front and three lights secured to the rear wheels, but more or less lights may be used, as desired. Moreover, a mirror may be used on each side of the bicycle, if desired, and the mirrors may be of any particular design, all in accordance with the needs or desires of the user and as is practical under various manufacturing and costs considerations. Moreover, and again, if desired, various colors may be used in addition to the amber and red discussed herein.

It will be noted that the wires on the frame connected to the conductive layer are enlarged for clarity, and may actually be connected from behind the plate. There is no danger of the wires rubbing against the wheel.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted for specific environments and operative requirements without departing from those principles. The appended claims are intended to cover and embrace any and all such modifications, within the limits only of the true spirit and scope of the invention. This specification and the appended claims have been prepared in accordance with the applicable patent laws and the rules promulgated under the authority thereof.

What is claimed is:

1. Bicycle lighting apparatus comprising, in combination:
   conductive frame means;
   wheel means, including
       axle means for rotatably securing the wheel means to the frame means,
       rim means spaced apart from the axle means,
       spoke means extending from the axle means to the rim means for securing the rim means to the axle means, and
       the axle means and the spoke means are conductive and are electrically connected to the frame means;
   a battery having a positive terminal and a negative terminal secured to the frame means for providing an electric current;
   a first conductor electrically connected to one of the terminals of the battery;
   switch means electrically connected to the first conductor and to the frame means for selectively connecting one terminal of the battery to the frame means;
   second conductor means connected to the other terminal of the battery and electrically isolated from the frame means and from the first conductor;
   nonconductive disc means secured to the wheel means and rotatable therewith;
   conductive layer means secured to the nonconductive disc means;
   brush means secured to the frame means but electrically isolated therefrom and including a conductive element biased against the conductive layer and electrically connected to the second conductor means for electrically connecting the conductive layer means to the battery;
   light means secured to the wheel means remote from the axle means and rotatable with the wheel means, and including
       a housing capable of transmitting light, and
       lamp means secured to the housing and electrically connected to the spoke means and to the conductive layer means for completing an electrical circuit from the battery means for illuminating the lamp means as the wheel means rotates.

2. The apparatus of claim 1 in which the nonconductive disc means is disposed about the axle means and includes a plurality of fastening elements spaced apart from each other and secured to the disc means and secured to the spoke means for securing the disc means to the wheel means.

3. The apparatus of claim 2 in which the plurality of fastening elements of the disc means comprises a plurality of elastic tension elements secured to the disc means and a plurality of clips secured to the spoke means, and each elastic tension element is secured to the disc means and to a clip for securing the disc means to the wheel means at a plurality of locations to center the disc means about the axle means.

4. The apparatus of claim 3 in which the lamp means includes
- a lamp illuminated by the electric current provided by the battery,
- a socket for receiving the lamp,
- third insulated conductor means electrically connected to the socket and to the conductive layer means for electrically connecting the lamp to the conductive layer means, and
- a ground conductor electrically connected to the socket and to the spoke means for completing the electrical circuit to illuminate the lamp from the electric current povided by the battery.

5. The apparatus of claim 4 in which the light means further includes rib means secured to the housing and comprising at least two pair of adjacent but spaced apart ribs, and each pair of the two pair receives a spoke for securing the housing to one of the wheels of the wheel means.

6. The apparatus of claim 5 in which the ground conductor is disposed between the ribs of one pair of ribs and is in electrical contact with the spoke received by the pair of ribs.

7. The apparatus of claim 3 in which:
- the conductive frame means includes a front fork and a rear fork,
- the wheel means includes a front wheel and a rear wheel,
- the axle means includes a front axle connected to the front wheel and secured to the front fork of the frame means and a rear axle connected to the rear wheel and secured to the rear fork of the frame means,
- the rim means includes a front rim for the front wheel and a rear rim for the rear wheel,
- the spoke means includes a plurality of spokes for securing the front rim to the front axle and a plurality of spokes for securing the rear rim to the rear axle,
- the nonconductive disc means includes a front disc disposed about the front axle and secured to the spokes of the front wheel and a rear disc disposed about the rear axle and secured to the spokes of the rear wheel,
- the conductive layer means includes a front conductive layer secured to the front nonconductive disc and a rear conductive layer secured to the rear nonconductive disc,
- the brush means includes front brush means secured to the front fork and in electrical contact with the conductive layer secured to the front nonconductive disc and rear brush means secured to the rear fork and in electrical contact with the conductive layer secured to the rear nonconductive disc, and
- the light means includes front light means secured to the front wheel and rear light means secured to the rear wheel.

8. The apparatus of claim 7 in which the second conductor means includes a first insulated conductor electrically connected to the conductive layer of the front nonconductive disc and a second insulated conductor electrically connected to the conductive layer of the rear nonconductive disc.

9. The apparatus of claim 8 in which the spoke means includes a spoke holder for each spoke to secure the spokes to the front and rear rim, and the housing of the light means includes an upper cylinder having a diameter dimensioned to fit between adjacent spokes and a lower cylinder dimensioned to fit between the spoke holders of the adjacent spokes for securing the light means to the wheel means adjacent the rim means.

10. The apparatus of claim 9 in which the frame means further includes a front mirror secured to the front fork for reflecting forwardly the transmitted light from the illuminated lamp means as the front wheel rotates, and a rear mirror secured to the rear fork for reflecting rearwardly the transmitted light from the illuminated lamp means as the rear wheel rotates.

* * * * *